(12) United States Patent
Yamamoto et al.

(10) Patent No.: US 11,890,759 B2
(45) Date of Patent: Feb. 6, 2024

(54) ROBOT CONTROL METHOD

(71) Applicant: Panasonic Intellectual Property Management Co., Ltd., Osaka (JP)

(72) Inventors: Ryosuke Yamamoto, Osaka (JP); Hiroyuki Nakata, Osaka (JP); Hiroyoshi Ueda, Osaka (JP); Atsumi Hashimoto, Osaka (JP); Masayoshi Iwatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 700 days.

(21) Appl. No.: 17/083,591

(22) Filed: Oct. 29, 2020

(65) Prior Publication Data

US 2021/0039256 A1 Feb. 11, 2021

Related U.S. Application Data

(63) Continuation of application No. PCT/JP2019/007077, filed on Feb. 25, 2019.

(30) Foreign Application Priority Data

May 10, 2018 (JP) .................................. 2018-091385

(51) Int. Cl.
*B25J 9/16* (2006.01)

(52) U.S. Cl.
CPC ............ *B25J 9/1666* (2013.01); *B25J 9/1602* (2013.01)

(58) Field of Classification Search
CPC ...... B25J 9/1666; B25J 9/1638; B25J 9/1602; B25J 9/1674; G05B 2219/39176
See application file for complete search history.

(56) References Cited

U.S. PATENT DOCUMENTS

| | | | |
|---|---|---|---|
| 6,408,225 B1 * | 6/2002 | Ortmeier | B25J 19/0012 700/254 |
| 7,313,464 B1 * | 12/2007 | Perreault | B25J 9/1666 700/262 |
| 8,655,429 B2 * | 2/2014 | Kuduvalli | B25J 9/1682 600/407 |

(Continued)

FOREIGN PATENT DOCUMENTS

| | | |
|---|---|---|
| JP | 04-034604 | 2/1992 |
| JP | 3493765 | 2/2004 |

(Continued)

OTHER PUBLICATIONS

Cheng, Programming advanced control functions for enhanced intelligence of industrial robots, 2010, IEEE, p. 4486-4490 (Year: 2010).*

Lens et al., Investigation of safety in human-robot-interaction for a series elastic, tendon-driven robot arm, 2012, IEEE, p. 4309-4314 (Year: 2012).*

(Continued)

*Primary Examiner* — Marc McDieunel
(74) *Attorney, Agent, or Firm* — Wenderoth, Lind & Ponack, L.L.P.

(57) ABSTRACT

Load information on a tool to be attached to a robot arm and collision sensitivity are input. Gravitational torque is calculated based on the input load information. A deflection amount of the robot arm is calculated based on the gravitational torque. A correction amount is calculated based on the collision sensitivity input. The deflection amount is corrected while the robot arm moves.

7 Claims, 5 Drawing Sheets

(56) References Cited

U.S. PATENT DOCUMENTS

| | | | |
|---|---|---|---|
| 11,564,756 B2* | 1/2023 | Shelton, IV | ..... A61B 17/07207 |
| 11,717,961 B2* | 8/2023 | Nakata | .................. B25J 13/088 |
| | | | 700/254 |
| 2012/0000891 A1 | 1/2012 | Nakanishi et al. | |
| 2019/0125361 A1* | 5/2019 | Shelton, IV | ........... A61B 90/30 |
| 2019/0260313 A1 | 8/2019 | Yamamoto et al. | |
| 2023/0064821 A1* | 3/2023 | Shelton, IV | ........... A61B 90/90 |
| 2023/0146947 A1* | 5/2023 | Shelton, IV | ....... A61B 18/1206 |
| | | | 606/144 |

FOREIGN PATENT DOCUMENTS

| | | |
|---|---|---|
| JP | 2007-190662 | 8/2007 |
| JP | 2010-069585 | 4/2010 |
| JP | 2010-231575 | 10/2010 |
| JP | 2012-11403 | 1/2012 |
| WO | 2017/170317 | 10/2017 |

OTHER PUBLICATIONS

Lian et al., Real time collision free motion control in telerobotic systems, 2001, IEEE, p. 135-140 (Year: 2001).*

Lu et al., Human-Robot Collision Detection and Identification Based on Wrist and Base Force/Torque Sensors, 2006, IEEE, p. 3796-3801 (Year: 2006).*

International Search Report dated Mar. 26, 2019 in International (PCT) Application No. PCT/JP2019/007077 with English translation.

Extended European Search Report dated Jun. 9, 2021 in corresponding European Patent Application No. 19800374.1.

Office Action dated May 20, 2022 in corresponding Indian Patent Application No. 202047049846.

Haddadin et al., "Robot Collisions: A Survey on Detection, Isolation, and Identification", IEEE Transactions on Robotics, vol. 33, No. 6, Dec. 2017, pp. 1292-1312.

* cited by examiner

| COLLISION DETECTION TORQUE (MAXIMUM TORQUE RATIO[%]) \ COLLISION SENSITIVITY [%] | 20% | 50% | 80% | 100% |
|---|---|---|---|---|
| 20[%] | × | × | × | ○ |
| 30[%] | × | × | × | ○ |
| 40[%] | × | × | ○ | ○ |
| 50[%] | × | ○ | ○ | ○ |

○:COLLISION DETECTED
×:COLLISION UNDETECTED

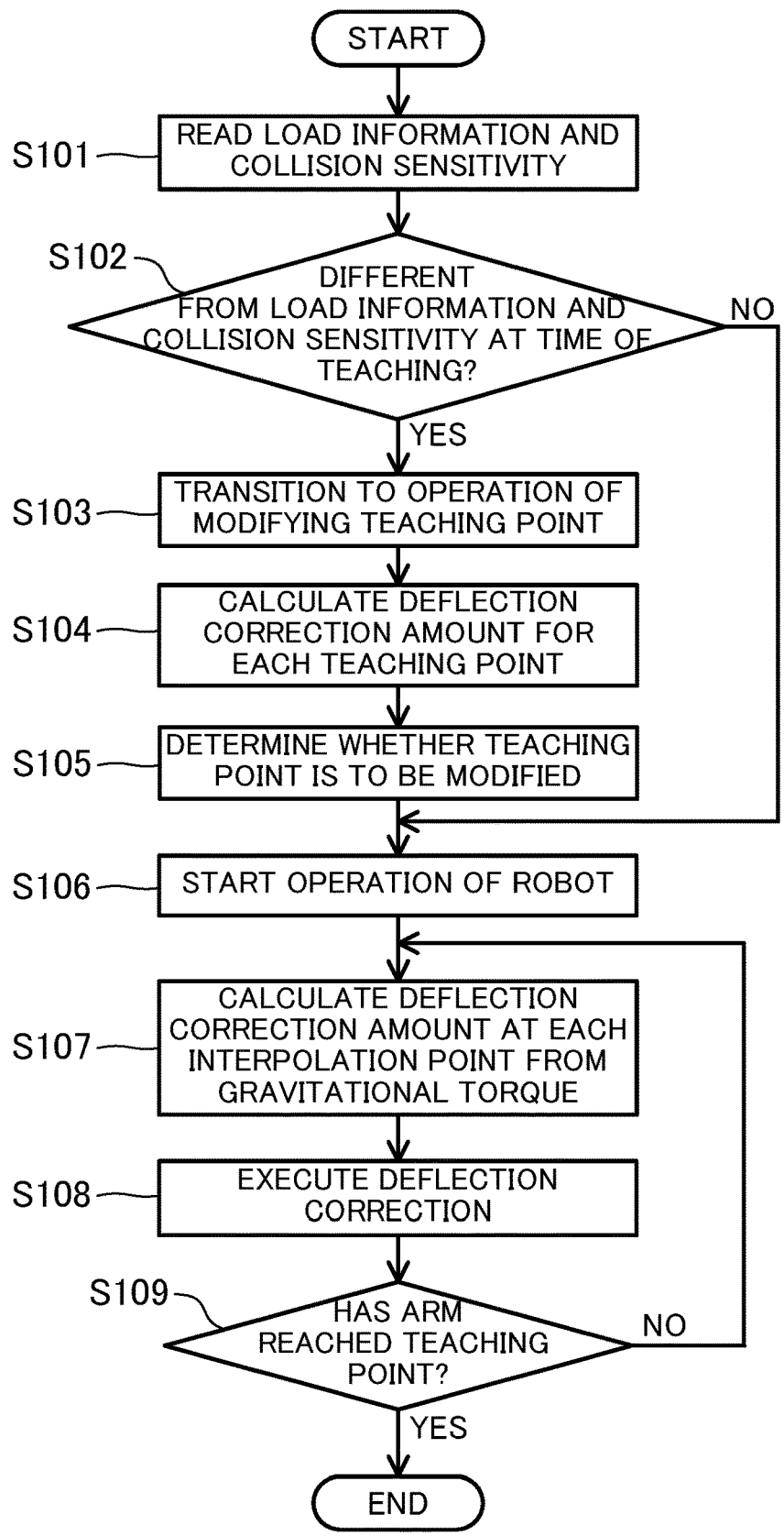

ROBOT CONTROL METHOD

CROSS-REFERENCE TO RELATED APPLICATIONS

This is a continuation of International Application No. PCT/JP2019/007077 filed on Feb. 25, 2019, which claims priority to Japanese Patent Application No. 2018-091385 filed on May 10, 2018. The entire disclosures of these applications are incorporated by reference herein.

BACKGROUND

The present invention relates to a robot control method.

A robot control method has been known to date, in which each joint portion of a robot is driven in accordance with teaching data (see, for example, Patent Documents 1 and 2). Since such a robot is driven using a speed reducer provided in the joint portion, the speed reducer and a bearing are elastically deformed and an arm is deflected. Accordingly, it is difficult to ensure absolute position accuracy.

Japanese Patent No. 3493765 discloses calculating a deflection amount due to gravity at representative points, the number of which is at least one or more, on a response trajectory between two teaching points and performing deflection correction so that the response trajectory agrees with a command trajectory.

Japanese Unexamined Patent Publication No. 2007-190662 discloses determining change in load torque from the load torque of each axis of the robot before a grip of a workpiece and the load torque of each axis in the state of gripping the workpiece, and correcting the deflection caused by the grip of the workpiece by manual operation.

SUMMARY

In the invention of Japanese Patent No. 3493765, however, suitable deflection correction cannot be performed when the actual load on the arm differs from the load on the arm that has been set at the time of teaching, as a result of, for example, changing the tool attached to the tip of the arm of the robot.

In addition, in the invention of Japanese Unexamined Patent Publication No. 2007-190662, since the deflection caused by the grip of the workpiece is corrected by manual operation, work is needed every time the load torque of the arm changes, and the work amount increases.

In view of the foregoing background, it is an object of the present invention to suitably correct a deflection amount of an arm even when a load attached to the arm is changed.

Aspects of the present disclosure are directed to a robot control method for operating an arm of a robot including a plurality of joint portions in accordance with a predetermined operation program, and solutions described below are adopted.

That is, in a first aspect, the method includes: inputting load information on a load to be attached to the arm and collision sensitivity indicating a threshold value for detection of a collision of the arm;

calculating gravitational torque to be applied to the joint portion based on the load information;

calculating a deflection amount of the arm based on the gravitational torque;

calculating a correction amount for correcting the deflection amount based on the collision sensitivity; and correcting the deflection amount based on the correction amount.

In the first aspect, the gravitational torque is calculated based on the load information input, and the deflection amount of the arm is calculated based on the gravitational torque. The correction amount is calculated based on the collision sensitivity input, and the deflection amount is corrected.

In this configuration, even when the load attached to the arm is changed, the deflection amount of the arm can be corrected suitably.

Specifically, if the collision sensitivity is high, a collision is detected quick. It may therefore be possible to consider that the information on the load attached to the arm is accurate. On the other hand, if the collision sensitivity is low, a collision is detected too late. Thus, the information on the load attached to the arm is unreliable.

As described above, since the accuracy of the load information and the collision sensitivity are in a proportional relation, the deflection correction amount may be set to be larger as the collision sensitivity increases.

For example, if the collision sensitivity is more than 80%, the load information may be considered to be accurate, and the deflection correction amount may be calculated in consideration of the deflection amount caused by the load and the deflection amount due to the mass of the arm.

On the other hand, if the collision sensitivity is less than 20%, the load information may be considered to be inaccurate, and the deflection correction amount may be calculated solely in consideration of the deflection amount due to the mass of the arm.

If the collision sensitivity is 20% or more and 80% or less, the deflection correction amount may be calculated so as to gradually increase as the collision sensitivity increases in consideration of the deflection amount caused by the load and the deflection amount due to the mass of the arm.

A second aspect is an embodiment of the first aspect. In the second aspect, the calculating the deflection amount is executed in real time during movement of the robot.

In the second aspect, the deflection amount is calculated in real time while the robot moves. It is therefore possible to calculate the deflection amount accurately in consideration of the position information on the robot that is moving, the posture of the arm, and the like.

A third aspect is an embodiment of the first or second aspect. In the third aspect, comparing load information set in advance at the time of creation of the operation program with load information newly input before execution of the operation program; and modifying the operation program if a difference between the load information set and the load information input is larger than a predetermined threshold value.

In the third aspect, the load information set in advance and the load information newly input are compared. If the difference therebetween is large, the operation program is modified.

Specifically, if a load larger than the load set at the time of creation of the operation program is attached to the arm, the deflection amount of the arm is larger than the amount that has been assumed. Thus, when the robot is operated in accordance with the original operation program, the arm moves along positions that deviate from a target travel path.

Therefore, when the load attached to the arm is changed, the operation program is modified so that the arm operates with a suitable correction amount in accordance with the new load. It is therefore possible to correct the deflection amount of the arm suitably and move the arm along the target travel path.

A fourth aspect is an embodiment of any one of the first to third aspects. In the fourth aspect, comparing collision sensitivity set in advance at the time of creation of the operation program with collision sensitivity newly input before execution of the operation program; and modifying the operation program when a difference between the collision sensitivity set and the collision sensitivity input is larger than a predetermined threshold value.

In the fourth aspect, the collision sensitivity set in advance and the collision sensitivity newly input are compared. If the difference therebetween is large, the operation program is modified.

Specifically, if the collision sensitivity set at the time of creation of the operation program is 80% and the collision sensitivity newly input is 20%, a collision is detected too late, and the information on the load attached to the arm is unreliable.

Therefore, when the collision sensitivity is changed, the operation program is modified so that the arm operates with a suitable correction amount in accordance with the new collision sensitivity.

A fifth aspect is an embodiment of any one of the first to fourth aspects. In the fifth aspect, the calculating the deflection amount, the calculating the correction amount, and the correcting the deflection amount are each executed at a plurality of interpolation points on a travel path of the robot.

In the fifth aspect, the calculation of the deflection amount, the calculation of the correction amount, and the correction of the deflection amount are each executed at a plurality of interpolation points on the travel path of the robot.

It is therefore possible to move the arm accurately along the target travel path through the correction of the deflection amount at the plurality of interpolation points on the travel path of the robot. The interpolation points as used herein each denote a target position in each control period while the arm moves between teaching points, i.e., target positions of the robot which are programmed.

According to the aspects of the present disclosure, even when the load attached to the arm is changed, the deflection amount of the arm can be corrected suitably.

BRIEF DESCRIPTION OF THE DRAWINGS

FIG. 5 is a flowchart illustrating a process of correcting a deflection amount of an arm.

DETAILED DESCRIPTION

Embodiments of the present invention are described in detail below with reference to the drawings. Note that the following description of preferred embodiments is merely an example in nature, and is not intended to limit the scope, applications, or use of the present invention.

Figure 1:
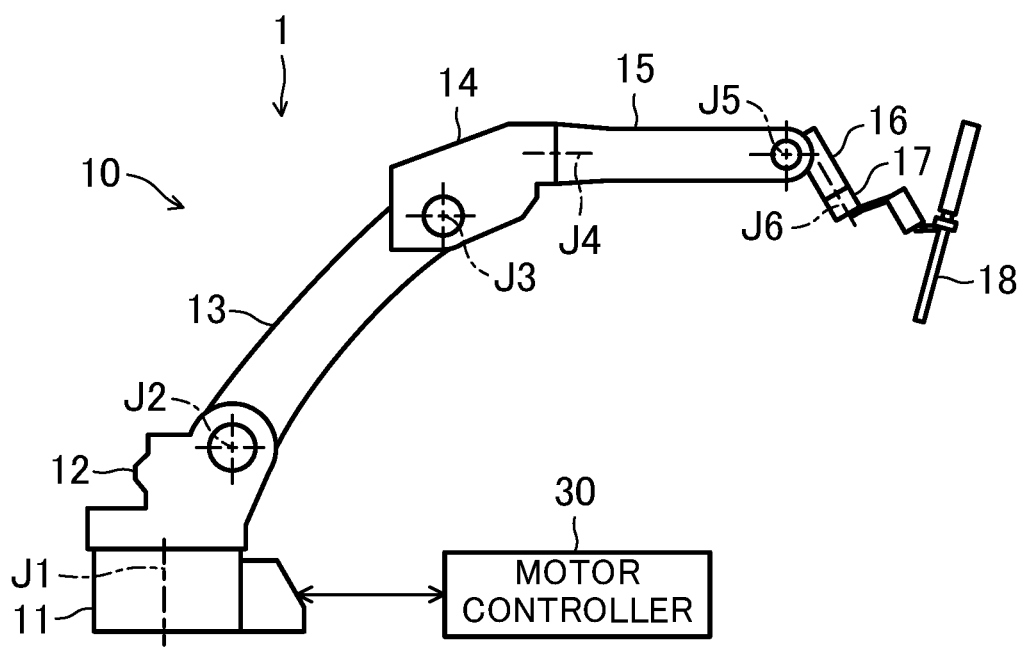
FIG. 1 is a side view illustrating a configuration of a robot according to an embodiment.

As illustrated in FIG. 1, a robot 1 includes a six-axis articulated robot arm 10. A motor controller 30, which controls the operation of the robot arm 10, is connected to the robot 1.

The robot arm 10 includes: a base portion 11; a shoulder portion 12 supported by the base portion 11 so as to be turnable in a horizontal direction about a first joint portion J1; a lower arm portion 13 supported by the shoulder portion 12 so as to be turnable in an upward and downward direction about a second joint portion J2; a first upper arm portion 14 supported by the lower arm portion 13 so as to be turnable in an upward and downward direction about a third joint portion J3; a second upper arm portion 15 supported on the distal end of the first upper arm portion 14 so as to be twistable and rotatable about a fourth joint portion J4; a wrist portion 16 supported by the second upper arm portion 15 so as to be turnable in an the upward and downward direction about a fifth joint portion J5; and an attachment portion 17 supported by the wrist portion 16 so as to be twistable and rotatable about a sixth joint portion J6. A tool 18 (a welding torch in FIG. 1) as a load is attached to the attachment portion 17.

A motor 21 (see FIG. 2) is built in each of the first to sixth joint portions J1 to J6. The motor controller 30 controls the driving of the motors 21 of the first to sixth joint portions J1 to J6 in accordance with an operation program input in advance through teaching or the like so that the first to sixth joint portions J1 to J6 reach respective target positions (command angles).

In the articulated robot 1, the robot arm 10 is deflected and deformed in a gravitational direction by the weight of the robot arm 10 and the mass of the tool 18 attached to the distal end of the robot arm 10.

Specifically, each of the first to sixth joint portions J1 to J6 is provided with a speed reducer and a bearing, which are not illustrated. The robot arm 10 is deflected because of elastic deformation of the speed reducer and the bearing, and a work point of the tool 18 at the distal end of the robot arm 10 deviates from the target position.

Thus, in the present embodiment, deflection correction of the robot arm 10 is executed based on load information on the tool 18 that is a load attached to the robot arm 10 and collision sensitivity indicating a threshold value for detection of a collision of the robot arm 10.

Figure 2:
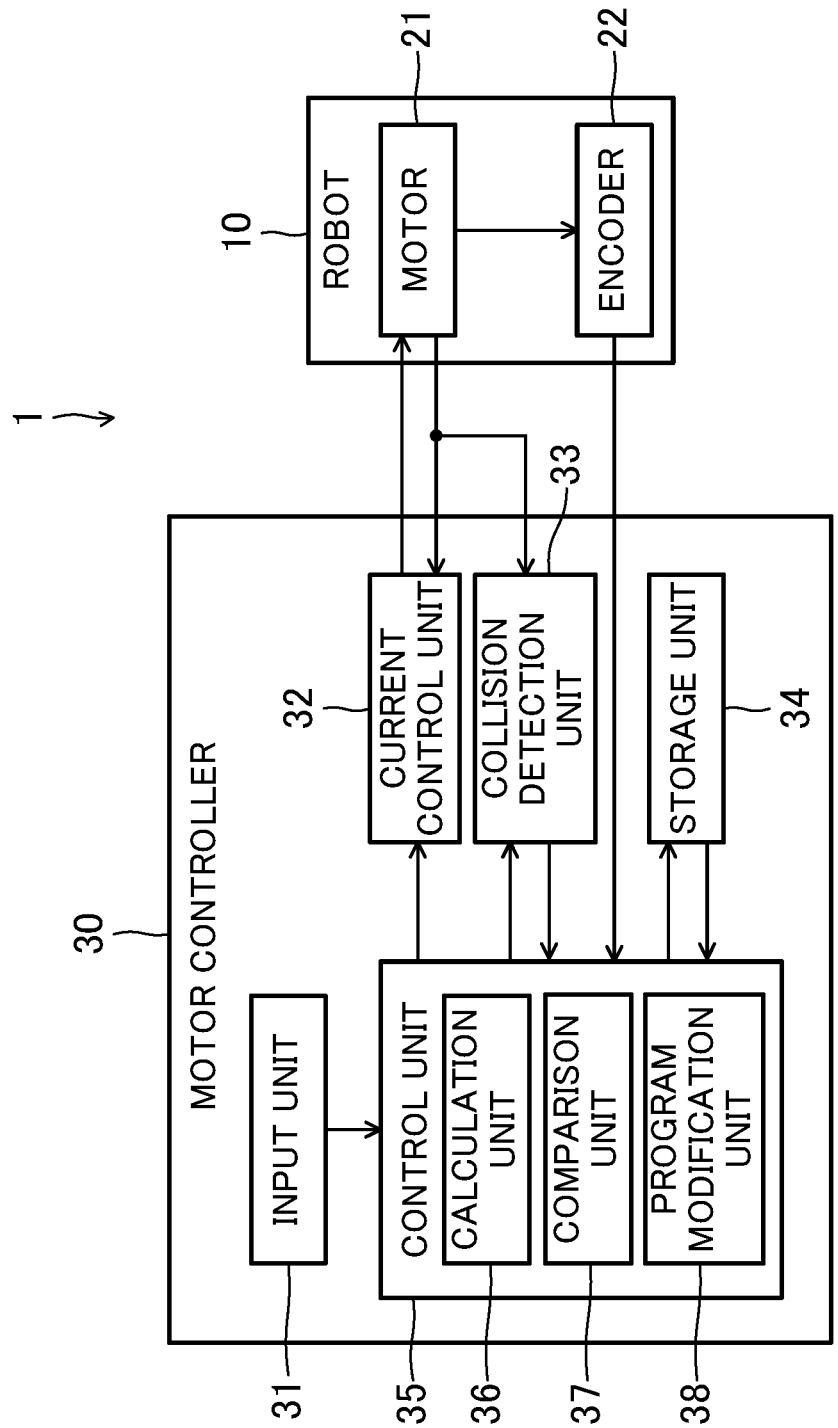
FIG. 2 is a block diagram illustrating a configuration of the robot.

As is also illustrated in FIG. 2, the motor controller 30 that controls the operation of the motor 21 is connected to the robot 1. The motor controller 30 includes an input unit 31, a current control unit 32, a collision detection unit 33, a storage unit 34, and a control unit 35.

In the robot 1, an encoder 22 detects the position of a rotor of the motor 21 in a predetermined sampling period. Then, information on the position of the motor 21 detected by the encoder 22 is transmitted to the control unit 35.

The input unit 31 inputs the load information including information on the mass of the tool 18 as the load attached to the robot arm 10 and the barycentric position of the tool 18, the collision sensitivity indicating a threshold value for detecting a collision of the robot arm 10, and the operation program for controlling the operation of the robot 1. The load information, the collision sensitivity, and the operation program input by the input unit 31 are transmitted to the control unit 35 and stored in the storage unit 34.

A torque command value and motor generation torque are input from the control unit 35 to the current control unit 32. The current control unit 32 calculates a drive command value and causes current to flow to the motor 21 based on the drive command value. The current control unit 32 controls the driving of the motor 21 in this manner.

The control unit 35 includes a calculation unit 36, a comparison unit 37, and a program modification unit 38. The calculation unit 36 calculates gravitational torque that acts on a joint portion of the motor 21 based on the rotational speed of the rotor, which is determined from temporal change in the position information on the motor 21, and the load information.

The calculation unit 36 calculates the deflection amount of the robot arm 10 based on the gravitational torque. Specifically, for each of the first to sixth joint portions J1 to J6, a deflection angle due to elastic deformation of the speed reducer or the bearing is calculated, and the deflection amount of the entire robot arm 10 is calculated based on the deflection angles of the first to sixth joint portions J1 to J6. The gravitational torque and the deflection amount calculated by the calculation unit 36 are transmitted to the storage unit 34 and stored therein.

The calculation unit 36 calculates the torque that originally acts on the motor 22 as kinetic torque based on the position information on the motor 21 obtainable from the encoder 21, the information on the speed and acceleration, and the load information on, for example, the masses of the tool 18 and the robot body.

The collision detection unit 33 compares the collision detection torque, which is the difference between the kinetic torque and the motor generation torque that has actually acted on the motor 21 through the control from the current control unit 32, with a collision detection threshold value.

The collision detection threshold value is determined in accordance with the collision sensitivity set in advance. If the collision detection torque is equal to or more than the collision detection threshold value, it means that a collision has occurred. The collision sensitivity is settable by a user. A threshold range is provided in accordance with the sensitivity to avoid erroneous detection of a collision and achieve accurate detection of a collision.

Figures 3, 4:
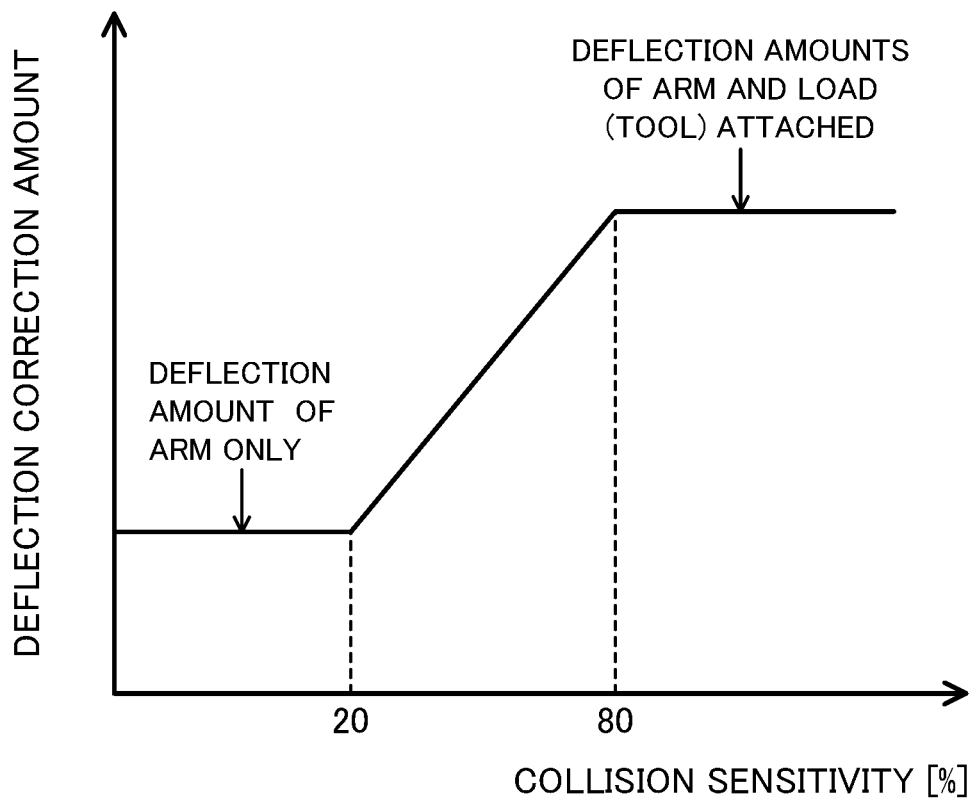
FIG. 3 is a table showing relation between collision sensitivity and collision detection torque.
FIG. 4 is a graph illustrating relation between collision sensitivity and a deflection correction amount.

Specifically, in the example illustrated in FIG. 3, when the collision detection torque (maximum torque ratio) is 20%, the detection result is not regarded as "collision" if the collision sensitivity is set to 20%, 50%, or 80%. On the other hand, if the collision sensitivity is set to 100%, the detection result is not regarded as a "collision." That is, the collision detection threshold value is set to 80% or more and less than 100%.

Also when the collision detection torque (maximum torque ratio) is 30%, the detection result is similar to the case of 20%.

When the collision detection torque (maximum torque ratio) is 40%, the collision detection threshold value is set with a collision sensitivity of 50% or more and less than 80%. Thus, for example, if the collision sensitivity is set to 50%, the detection result is not regarded as a "collision", whereas if the collision sensitivity is set to 80%, the detection result is regarded as a "collision."

When the collision detection torque (maximum torque ratio) is 50%, the collision detection threshold value is set at a collision sensitivity of 20% or more and less than 50%. Thus, if the collision sensitivity is set to 20%, the detection result is not regarded as a "collision", whereas if the collision sensitivity is set to 50% or more, the detection result is regarded as a "collision."

As described above, a collision is detected more frequently at higher collision sensitivity, and a collision is detected less frequently at lower collision sensitivity. For example, with high collision sensitivity, even a small impact is regarded as a "collision." On the contrary, with low collision sensitivity, a small impact is not regarded as a "collision."

When collision torque is detected at the start of energization of the motor 21, the magnitude of the collision detection threshold value is determined in accordance with the collision sensitivity that is set. Therefore, it can be said that the set collision sensitivity represents the accuracy of the load information. The collision sensitivity can be freely set in advance by the user with the input unit 31.

In the present embodiment, the calculation unit 36 calculates a correction amount for correcting the deflection amount of the robot arm 10 based on the collision sensitivity that has been input. The relation between the deflection correction amount and the collision sensitivity will be described below.

Specifically, if the collision sensitivity is high, a collision is detected quick. It may therefore be possible to consider that the load information on the tool 18 attached to the robot arm 10 is accurate. On the other hand, if the collision sensitivity is low, a collision is detected too late. Thus, the load information on the tool 18 attached to the robot arm 10 is unreliable.

As described above, since the accuracy of the load information on the tool 18 and the collision sensitivity are in a proportional relation, the deflection correction amount may be set to be larger as the collision sensitivity increases.

As illustrated in FIG. 4, for example, if the collision sensitivity is more than 80%, the load information on the tool 18 may be considered to be accurate, and the deflection correction amount may be calculated in consideration of the deflection amount caused by the load and the deflection amount due to the mass of the robot arm 10.

On the other hand, if the collision sensitivity is less than 20%, the load information of the tool 18 may be considered to be inaccurate, and the deflection correction amount may be calculated solely in consideration of the deflection amount due to the mass of the robot arm 10.

If the collision sensitivity is 20% or more and 80% or less, the deflection correction amount may be calculated so as to gradually increase as the collision sensitivity increases in consideration of the deflection amount caused by the load and the deflection amount due to the mass of the robot arm 10. The correction amount calculated by the calculation unit 36 is transmitted to the storage unit 34 and stored therein.

The comparison unit 37 compares the load information and the collision sensitivity which are set in advance at the time of creation of the operation program with the load information and the collision sensitivity newly input before execution of the operation program.

The program modification unit 38 modifies the operation program based on the result of comparison by the comparison unit 37. Specifically, when the difference between the load information set in advance and the load information newly input is larger than a predetermined threshold value (such as a case where the tool 18 larger in mass than the tool 18 that has been set at the time of creation of the operation program is attached to the robot arm 10), the deflection amount of the robot arm 10 is larger than that assumed.

When the difference between the collision sensitivity set in advance and the collision sensitivity newly input is larger than the predetermined threshold value (such as a case where the collision sensitivity set at the time of creation of the operation program is 80% and the collision sensitivity newly input is 20%), a collision is detected too late, and the information on the tool 18 attached to the robot arm 10 therefore becomes unreliable.

Therefore, when the load information on the tool 18 attached to the robot arm 10 and the collision sensitivity are changed, the program modification unit 38 modifies the operation program so that the robot arm 10 operates with a suitable correction amount in accordance with the new load information and collision sensitivity.

It is therefore possible to correct the deflection amount of the robot arm 10 suitably and move the robot arm 10 along the target travel path.

<Operation of Robot>

Figure 6A:
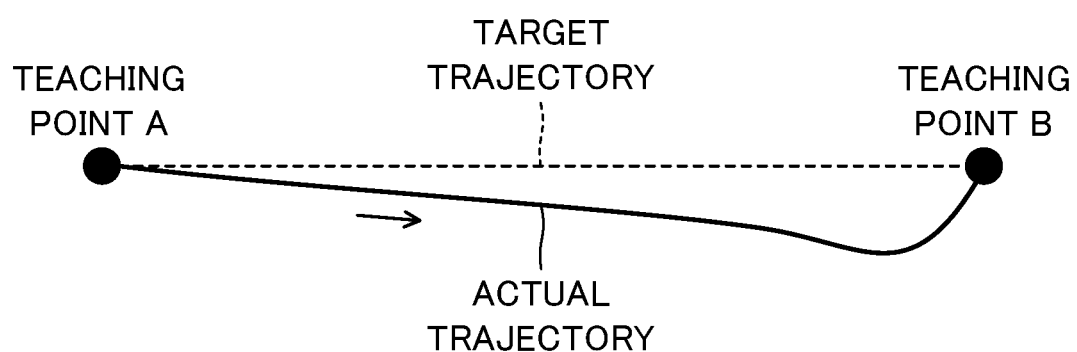
FIG. 6A is a diagram illustrating a trajectory of the arm when deflection correction is not performed.
Figure 6B:
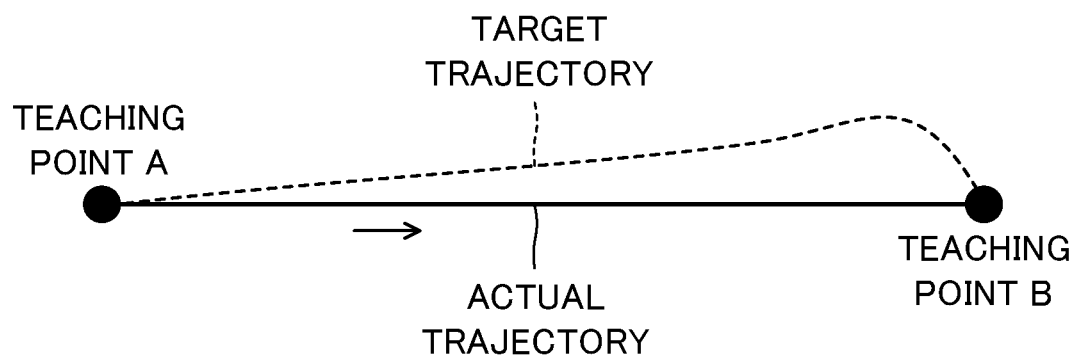
FIG. 6B is a diagram illustrating a trajectory of the arm when deflection correction is performed.

A process of correcting the deflection amount of the robot arm 10 will be described below with reference to the flowchart shown in FIG. 5. It is assumed that, as illustrated in FIGS. 6A and 6B, the robot arm 10 is operated to move from a teaching point A to a teaching point B.

As illustrated in FIG. 5, in step S101, the load information and the collision sensitivity that have been input are read, and the process proceeds to step S102.

In step S102, it is determined whether the load information and the collision sensitivity set at the time of creation (teaching) of the operation program and the load information and the collision sensitivity newly input are different from each other. If the determination in step S102 indicates "YES", the process proceeds to step S103. If the determination in step S102 indicates "NO", the process proceeds to step S106.

In step S103, the process transitions to an operation of modifying a teaching point in the operation program and proceeds to step S104.

In step S104, the deflection correction amount for each teaching point is calculated, and the process proceeds to step S105.

In step S105, the user determines whether to modify a teaching point, and the process proceeds to step S106. The user has a chance to make such determination because, like the teaching playback method, some teaching operations may be programmed by taking the deflection amount into account.

In step S106, the operation of the robot 1 is started in accordance with the operation program, and the process proceeds to step S107.

In step S107, while the robot arm 10 moves along the travel path, the deflection correction amount is calculated based on the gravitational torque at each interpolation point on the travel path, and the process proceeds to step S108. The interpolation point as used herein denotes a target position in each control period while the robot arm 10 moves between the teaching point A and the teaching point B.

In step S108, while the robot arm 10 moves along the travel path, the deflection correction is executed in real time, and the process proceeds to step S109.

In step S109, whether the robot arm 10 has reached the teaching point B is determined. If the determination in step S109 indicates "YES", the deflection correction process is ended. If the determination in step S109 indicates "NO", the process proceeds to step S107 and the process is repeated.

FIGS. 6A and 6B are diagrams each for describing a difference between a target trajectory and an actual trajectory while the robot arm 10 is moved from the teaching point A to the teaching point B. In each of FIGS. 6A and 6B, the target trajectory is indicated by a dotted line and the actual trajectory is indicated by a solid line.

As illustrated in FIG. 6A, even if the robot arm 10 is programmed to move along the target trajectory, which is a straight line between the teaching point A and the teaching point B, in actuality, the robot arm 10 moves gradually downward in a diagonally rightward direction from the teaching point A to the teaching point B as in FIG. 6A if the deflection amount of the robot arm 10 is not taken into account. Thus, the robot arm 10 can possibly come into contact with an unillustrated workpiece in the middle of the travel path.

On the other hand, according to the present embodiment, as illustrated in FIG. 6B, the robot arm 10 is moved while taking deflection amount of the robot arm 10 into account and correcting the deflection amount of the robot arm 10. Specifically, the robot arm 10 is moved from the teaching point A to the teaching point B along the target trajectory, the shape of which is a vertically inverted shape of the actual trajectory indicated by the solid line in FIG. 6A.

The deflection of the robot arm 10 is canceled out in this manner, and it is possible to move the robot arm 10 along the actual trajectory that is a straight line between the teaching point A and the teaching point B as illustrated in FIG. 6B.

As can be seen from the foregoing description, according to the present invention, it is possible to correct the deflection amount of an arm even if a load attached to the arm is changed. This is very practical and useful and therefore highly applicable in the industry.

What is claimed is:

1. A robot control method for operating an arm of a robot including a plurality of joint portions in accordance with a predetermined operation program, the method comprising:
    inputting load information on a load to be attached to the arm and collision sensitivity indicating a threshold value for detection of a collision of the arm:
    comparing load information set in advance at the time of creation of the operation program with load information newly input before execution of the op eration program; and
modifying the operation program if a difference between the load information set and the load information input is larger than a predetermined threshold value:
    calculating by a processor gravitational torque to be applied to the joint portion based on the load information;
    calculating by the processor a deflection amount of the arm based on the gravitational torque;
    calculating by the processor a correction amount for correcting the deflection amount based on the collision sensitivity; and
    correcting the deflection amount based on the correction amount.

2. The robot control method of claim 1, wherein the calculating the deflection amount is executed in real time during movement of the robot.

3. The robot control method of claim 1, wherein the calculating the deflection amount, the calculating the correction amount, and the correcting the deflection amount are each executed at a plurality of interpolation points on a travel path of the robot.

4. A robot control method for operating an arm of a robot including a plurality of joint portions in accordance with a predetermined operation program, the method comprising:
    inputting load information on a load to be attached to the arm and collisi on sensitivity indicating a threshold value for detection of a collision of the arm;
    comparing collision sensitivity set in advance at the time of creation of the operation program with collision sensitivity newly input before execution of the operation program;

modifying the operation program when a difference between the collision sensitivity set and the collision sensitivity input is larger than a predetermined threshold value;

calculating by a processor gravitational torque to be applied to the joint p ortion based on the load information;

calculating by the processor a deflection amount of the arm based on the gravitational torque;

calculating by the processor a correction amount for correcting the deflec tion amount based on the collision sensitivity; and correcting the deflection amount based on the correction amount.

5. The robot control method of claim 1, comprising:

comparing collision sensitivity set in advance at the time of creation of the operation program with collision sensitivity newly input before execution of the operation program; and modifying the operation program when a difference between the collision sensitivity set and the collision sensitivity input is larger than a predetermined threshold value.

6. The robot control method of claim 4, wherein the calculating the deflection amount is executed in real time during movement of the robot.

7. The robot control method of claim 4, wherein the calculating the deflection amount, the calculating the correction amount, and the correcting the deflection amount are each executed at a plurality of interpolation points on a travel path of the robot.

\* \* \* \* \*